(12) United States Patent
Nishitani et al.

(10) Patent No.: US 12,204,327 B2
(45) Date of Patent: Jan. 21, 2025

(54) REMOTE DRIVING TAXI SYSTEM, MOBILITY SERVICE MANAGEMENT METHOD, AND REMOTE DRIVING TAXI MANAGEMENT DEVICE

(71) Applicant: TOYOTA JIDOSHA KABUSHIKI KAISHA, Toyota (JP)

(72) Inventors: Toru Nishitani, Nisshin (JP); Rio Suda, Numazu (JP); Hiroshi Yonenaga, Shinagawa-ku (JP); Hidekazu Sasaki, Yokohama (JP); Tatsushi Takenaka, Toyota (JP); Shun Ota, Susono (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/808,036

(22) Filed: Jun. 21, 2022

(65) Prior Publication Data

US 2023/0023172 A1 Jan. 26, 2023

(30) Foreign Application Priority Data

Jul. 21, 2021 (JP) ................. 2021-120681

(51) Int. Cl.
*G05D 1/00* (2024.01)
*B60W 40/08* (2012.01)
(Continued)

(52) U.S. Cl.
CPC .......... *G05D 1/0011* (2013.01); *B60W 40/08* (2013.01); *B60W 60/00253* (2020.02);
(Continued)

(58) Field of Classification Search
CPC ...... G05D 1/0011; G05D 1/0027; G05D 1/00; B60W 40/08; B60W 60/00253;
(Continued)

(56) References Cited

U.S. PATENT DOCUMENTS

| 4,550,304 A | * | 10/1985 | Saitta | ..................... | B60Q 1/503 |
| | | | | | 340/472 |
| 7,191,057 B2 | * | 3/2007 | Adamczyk | ............. | G08G 1/202 |
| | | | | | 701/485 |

(Continued)

FOREIGN PATENT DOCUMENTS

| JP | 2004-295360 A | 10/2004 |
| JP | 2017-174208 A | 9/2017 |

(Continued)

*Primary Examiner* — Angelina M Shudy
(74) *Attorney, Agent, or Firm* — Finnegan, Henderson, Farabow, Garrett and Dunner, LLP

(57) ABSTRACT

A remote driving taxi system provides a mobility service using remote driving taxis that are driven by remote drivers. Management information indicates assignment states between the remote driving taxis and the remote drivers. The remote driving taxi system executes an assignment process based on the management information, in response to a request from a user. Specifically, the remote driving taxi system selects one of unassigned taxis to each of which the remote driver has not been assigned, as a first remote driving taxi that provides the service to the user. Further, the remote driving taxi system selects one of remote drivers each of which has not been assigned to the remote driving taxi, as a first remote driver that provides the service to the user. Then, the remote driving taxi system assigns the first remote driver to the first remote driving taxi.

1 Claim, 13 Drawing Sheets

(51) Int. Cl.
*B60W 60/00* (2020.01)
*G06Q 10/0631* (2023.01)
*G06Q 10/0639* (2023.01)

(52) U.S. Cl.
CPC . *G06Q 10/06315* (2013.01); *G06Q 10/06395* (2013.01); *G06Q 10/06398* (2013.01)

(58) Field of Classification Search
CPC ....... G06Q 10/06315; G06Q 10/06395; G06Q 10/06398; G08G 1/202; G08G 1/00; G01C 21/00; B60Q 1/507; B60Q 1/543; B60Q 2800/10; G07B 13/045
See application file for complete search history.

(56) References Cited

U.S. PATENT DOCUMENTS

| | | | | |
|---|---|---|---|---|
| 9,494,935 B2* | 11/2016 | Okumura | | B60W 30/00 |
| 9,940,651 B2* | 4/2018 | Ross | | G08G 1/20 |
| 11,249,473 B2* | 2/2022 | Shintani | | G01C 21/3407 |
| 11,551,554 B2* | 1/2023 | Woodrow | | G07C 5/008 |
| 11,619,951 B2* | 4/2023 | Alonso-Mora | | G06Q 10/06311 |
| | | | | 701/26 |
| 12,037,007 B2* | 7/2024 | Fukudome | | G05D 1/0038 |
| 12,148,306 B2* | 11/2024 | Kratz | | G06Q 50/40 |
| 2006/0136254 A1 | 6/2006 | Greenstein | | G06Q 10/02 |
| | | | | 705/5 |
| 2012/0158299 A1* | 6/2012 | Cerecke | | G01C 21/3469 |
| | | | | 701/533 |
| 2013/0238167 A1* | 9/2013 | Stanfield | | G08G 1/20 |
| | | | | 701/2 |
| 2013/0297463 A1* | 11/2013 | Garber | | G06Q 10/087 |
| | | | | 705/28 |
| 2014/0207535 A1* | 7/2014 | Stefan | | G06Q 10/06398 |
| | | | | 701/1 |
| 2015/0161752 A1* | 6/2015 | Barreto | | G06Q 10/063114 |
| | | | | 705/7.15 |
| 2015/0356703 A1* | 12/2015 | Ellis | | G06Q 50/40 |
| | | | | 705/7.17 |
| 2016/0034845 A1* | 2/2016 | Hiyama | | G06Q 10/02 |
| | | | | 705/7.15 |
| 2016/0055750 A1* | 2/2016 | Linder | | G08G 1/16 |
| | | | | 340/905 |
| 2016/0139594 A1* | 5/2016 | Okumura | | B60W 30/00 |
| | | | | 701/2 |
| 2016/0210675 A1* | 7/2016 | Smart | | G06Q 50/26 |
| 2016/0247109 A1* | 8/2016 | Scicluna | | G06Q 50/40 |
| 2016/0364678 A1* | 12/2016 | Cao | | G06Q 10/083 |
| 2017/0024393 A1* | 1/2017 | Choksi | | G06F 16/24578 |
| 2017/0083957 A1* | 3/2017 | Ross | | G05D 1/0234 |
| 2017/0178085 A1* | 6/2017 | Kragh | | G06Q 10/063114 |
| 2017/0186054 A1* | 6/2017 | Fish | | G06Q 50/40 |
| 2017/0186324 A1* | 6/2017 | Fish | | G07C 5/0816 |
| 2017/0229018 A1* | 8/2017 | Levy | | G01C 21/3617 |
| 2017/0293950 A1* | 10/2017 | Rathod | | G06Q 30/0283 |
| 2017/0352125 A1* | 12/2017 | Dicker | | G06Q 50/40 |
| 2018/0012151 A1* | 1/2018 | Wang | | G06Q 10/08 |
| 2018/0080776 A1* | 3/2018 | Nimchuk | | G01C 21/3415 |
| 2018/0080777 A1* | 3/2018 | Nimchuk | | G01C 21/3415 |
| 2018/0081374 A1* | 3/2018 | Nimchuk | | G06Q 10/08355 |
| 2018/0099611 A1* | 4/2018 | Sugimoto | | G07B 13/04 |
| 2018/0137593 A1* | 5/2018 | Djuric | | G06Q 50/40 |
| 2018/0165648 A1* | 6/2018 | Berry | | G06F 16/2365 |
| 2018/0165649 A1* | 6/2018 | Quitzke | | G06Q 50/40 |
| 2018/0204158 A1* | 7/2018 | Ratti | | G06Q 10/06315 |
| 2018/0211218 A1* | 7/2018 | Berdinis | | G06Q 10/08345 |
| 2018/0215312 A1* | 8/2018 | Salter | | B60Q 1/543 |
| 2018/0224866 A1* | 8/2018 | Alonso-Mora | | G05D 1/0291 |
| 2018/0240054 A1* | 8/2018 | Li | | G06Q 30/08 |
| 2018/0364062 A1* | 12/2018 | Wang | | G06Q 10/063114 |
| 2019/0026695 A1* | 1/2019 | Yajnanarayana | | |
| | | | | G06Q 10/063112 |
| 2019/0066033 A1* | 2/2019 | Mains, Jr. | | G06Q 10/083 |
| 2019/0066516 A1* | 2/2019 | Kuhara | | G08G 1/202 |
| 2019/0113353 A1* | 4/2019 | Shimizu | | B60W 50/082 |
| 2019/0163176 A1* | 5/2019 | Wang | | G05D 1/0027 |
| 2019/0195638 A1* | 6/2019 | Tajammul | | G01C 21/3453 |
| 2019/0220036 A1* | 7/2019 | Weslosky | | G07C 5/008 |
| 2019/0294160 A1* | 9/2019 | Shintani | | G01C 21/3407 |
| 2019/0304043 A1* | 10/2019 | Nakamura | | G08G 1/202 |
| 2019/0339692 A1* | 11/2019 | Sakai | | G05D 1/0027 |
| 2020/0026286 A1* | 1/2020 | Vozar | | G07C 5/008 |
| 2020/0034941 A1* | 1/2020 | Nakanishi | | G06F 16/909 |
| 2020/0104965 A1* | 4/2020 | Ramot | | G08G 1/202 |
| 2020/0160705 A1* | 5/2020 | Chase | | G06Q 50/40 |
| 2020/0209888 A1* | 7/2020 | Sakai | | G05D 1/0276 |
| 2020/0211070 A1* | 7/2020 | Singh | | G06Q 30/0284 |
| 2020/0226498 A1* | 7/2020 | Jiwani | | G06Q 10/02 |
| 2020/0226543 A1* | 7/2020 | Sharinn | | G06K 7/1439 |
| 2020/0265348 A1* | 8/2020 | Nimesh | | G01C 21/3492 |
| 2020/0265542 A1* | 8/2020 | Matsushima | | G06Q 50/40 |
| 2020/0302566 A1* | 9/2020 | Wang | | B60Q 1/5035 |
| 2020/0326702 A1* | 10/2020 | Iwamoto | | B60T 7/16 |
| 2020/0393257 A1* | 12/2020 | Dryjanski | | G07B 15/02 |
| 2021/0011470 A1* | 1/2021 | Suzuki | | G05D 1/0044 |
| 2021/0041894 A1* | 2/2021 | Urano | | G05D 1/0223 |
| 2021/0116907 A1* | 4/2021 | Altman | | B60W 60/0015 |
| 2021/0142248 A1* | 5/2021 | Balva | | G08G 1/202 |
| 2021/0192420 A1* | 6/2021 | Spielman | | G06N 5/01 |
| 2021/0192583 A1* | 6/2021 | Gulati | | G06Q 10/047 |
| 2021/0192584 A1* | 6/2021 | Spielman | | G06Q 10/047 |
| 2021/0192585 A1* | 6/2021 | Gulati | | G06Q 10/02 |
| 2021/0192663 A1* | 6/2021 | Spielman | | G06N 5/04 |
| 2021/0192945 A1* | 6/2021 | Kaneichi | | G08G 1/081 |
| 2021/0206343 A1* | 7/2021 | Welk | | B60K 35/80 |
| 2021/0334736 A1* | 10/2021 | Mains, Jr. | | G06Q 10/06311 |
| 2021/0387540 A1* | 12/2021 | Ohmori | | B60L 53/10 |
| 2022/0005140 A1* | 1/2022 | Beaurepaire | | G06F 16/9535 |
| 2022/0048432 A1* | 2/2022 | Switalski | | G08G 1/205 |
| 2022/0080879 A1* | 3/2022 | Moon | | B60Q 1/547 |
| 2022/0083938 A1* | 3/2022 | Seto | | G06Q 10/06311 |
| 2022/0126864 A1* | 4/2022 | Moustafa | | G06T 1/0007 |
| 2022/0188866 A1* | 6/2022 | Farmer | | G06Q 10/02 |
| 2022/0250657 A1* | 8/2022 | Kratz | | B60W 60/00253 |
| 2022/0318719 A1* | 10/2022 | Dhingra | | G07C 9/00571 |
| 2022/0368860 A1* | 11/2022 | Shinohara | | G06V 20/56 |
| 2023/0020040 A1* | 1/2023 | Tam | | G08G 1/0141 |
| 2023/0023172 A1* | 1/2023 | Nishitani | | G06Q 10/06395 |
| 2023/0095009 A1* | 3/2023 | Kim | | G06Q 10/02 |
| | | | | 455/456.2 |
| 2023/0142544 A1* | 5/2023 | Koniaris | | B60W 50/14 |
| | | | | 701/24 |
| 2023/0166771 A1* | 6/2023 | Fernandez-Moral | | |
| | | | | G05D 1/227 |
| | | | | 701/2 |
| 2023/0191990 A1* | 6/2023 | Park | | B60Q 3/80 |
| | | | | 315/77 |
| 2024/0036571 A1* | 2/2024 | Goldman | | G05D 1/0027 |
| 2024/0054415 A1* | 2/2024 | Stevens | | G06Q 10/06311 |
| 2024/0111304 A1* | 4/2024 | El Assaad | | G05D 1/2274 |
| 2024/0127129 A1* | 4/2024 | Li | | G06Q 10/02 |
| 2024/0131982 A1* | 4/2024 | Li | | B60Q 1/0035 |
| 2024/0166250 A1* | 5/2024 | Dunn | | B61L 27/20 |
| 2024/0192680 A1* | 6/2024 | Gupta | | G06Q 10/063116 |
| 2024/0212505 A1* | 6/2024 | Gnilova | | G08G 1/202 |

FOREIGN PATENT DOCUMENTS

JP 2018-142265 A 9/2018
JP 2020-052926 A 4/2020

* cited by examiner

FIG. 4

< VEHICLE MANAGEMENT INFORMATION 510 >

| VEHICLE ID | VEHICLE TYPE | USE STATE | DRIVER IN CHARGE | CURRENT POSITION | DESTINATION | TRAVELING STATE |
|---|---|---|---|---|---|---|

FIG. 6
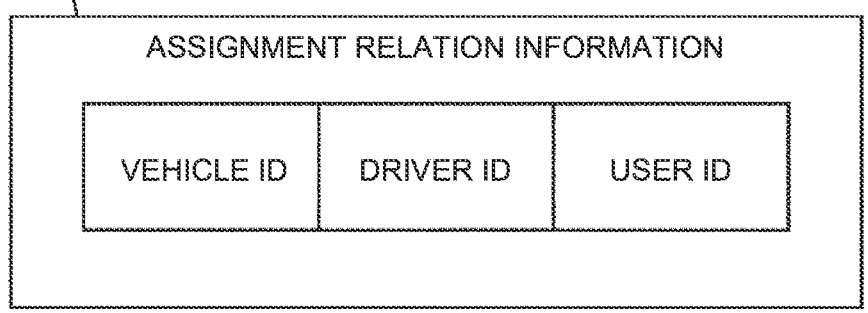
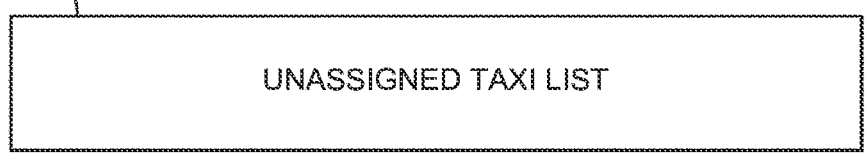
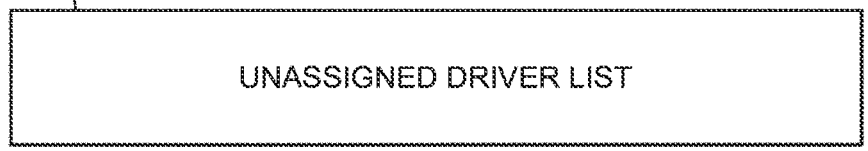

| TAXI USE STATE | DISPLAY LAMP STATE |
|---|---|
| DRIVER ASSIGNED & AVAILABLE | PUT ON |
| DRIVER ASSIGNED & UNAVAILABLE | PUT OFF |
| DRIVER NOT ASSIGNED | PUT ON OR PUT OFF DEPENDING ON NUMBER OF UNASSIGNED DRIVERS |

REMOTE DRIVING TAXI SYSTEM, MOBILITY SERVICE MANAGEMENT METHOD, AND REMOTE DRIVING TAXI MANAGEMENT DEVICE

CROSS-REFERENCE TO RELATED APPLICATION

This application claims priority to Japanese Patent Application No. 2021-120681 filed on Jul. 21, 2021, incorporated herein by reference in its entirety.

BACKGROUND

1. Technical Field

The present disclosure relates to a mobility service using remote driving taxis that are driven by remote drivers.

2. Description of Related Art

Japanese Unexamined Patent Application Publication No. 2004-295360 discloses a vehicle remote driving device that drives a vehicle by remote operation.

SUMMARY

In the case of an existing taxi service, each taxi driver drives one taxi in a limited region. That is, the taxi driver is bound by the location and the vehicle. This causes loss of work opportunity and decrease in operational efficiency.

An object of the present disclosure is to provide a new mobility service.

A first aspect relates to a remote driving taxi system that provides a mobility service, the mobility service using remote driving taxis that are driven by remote drivers. The remote driving taxi system includes: a single or a plurality of processors; and a single or a plurality of storage devices configured to store management information including assignment states between the remote driving taxis and the remote drivers. The single or the plurality of processors executes an assignment process based on the management information, in response to a request from a user. In the assignment process, the single or the plurality of processors selects one of unassigned taxis as a first remote driving taxi that provides the mobility service to the user, each of the unassigned taxis being the remote driving taxi to which the remote driver has not been assigned, selects one of unassigned drivers as a first remote driver that provides the mobility service to the user, each of the unassigned drivers being the remote driver that has not been assigned to the remote driving taxi, and assigns the first remote driver to the first remote taxi.

A second aspect relates to a mobility service management method for managing a mobility service, the mobility service using remote driving taxis that are driven by remote drivers. The mobility service management method includes: a process of acquiring management information including assignment states between the remote driving taxis and the remote drivers; and a process of executing an assignment process based on the management information, in response to a request from a user. The assignment process includes: a process of selecting one of unassigned taxis as a first remote driving taxi that provides the mobility service to the user, each of the unassigned taxis being the remote driving taxi to which the remote driver has not been assigned; a process of selecting one of unassigned drivers as a first remote driver that provides the mobility service to the user, each of the unassigned drivers being the remote driver that has not been assigned to the remote driving taxi; and a process of assigning the first remote driver to the first remote taxi.

A third aspect relates to a remote driving taxi management device that manages a mobility service, the mobility service using remote driving taxis that are driven by remote drivers. The remote driving taxi management device includes: a single or a plurality of processors; and a single or a plurality of storage devices configured to store management information including assignment states between the remote driving taxis and the remote drivers. The single or the plurality of processors executes an assignment process based on the management information, in response to a request from a user. In the assignment process, the single or the plurality of processors selects one of unassigned taxis as a first remote driving taxi that provides the mobility service to the user, each of the unassigned taxis being the remote driving taxi to which the remote driver has not been assigned, selects one of unassigned drivers as a first remote driver that provides the mobility service to the user, each of the unassigned drivers being the remote driver that has not been assigned to the remote driving taxi, and assigns the first remote driver to the first remote taxi.

The resent disclosure provides a new mobility service using remote driving taxis that are driven by remote drivers. The remote drivers are not bounded by either vehicles or locations. Consequently, the work opportunity is increased, and the operational efficiency is enhanced.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a conceptual diagram for describing an example of vehicle management information according to the embodiment of the present disclosure;

FIG. 6 is a conceptual diagram for describing an example of assignment management information according to the embodiment of the present disclosure;

DETAILED DESCRIPTION OF EMBODIMENTS

An embodiment of the present disclosure will be described with reference to the accompanying drawings.

1. Remote Driving Taxi Service

Figure 1:
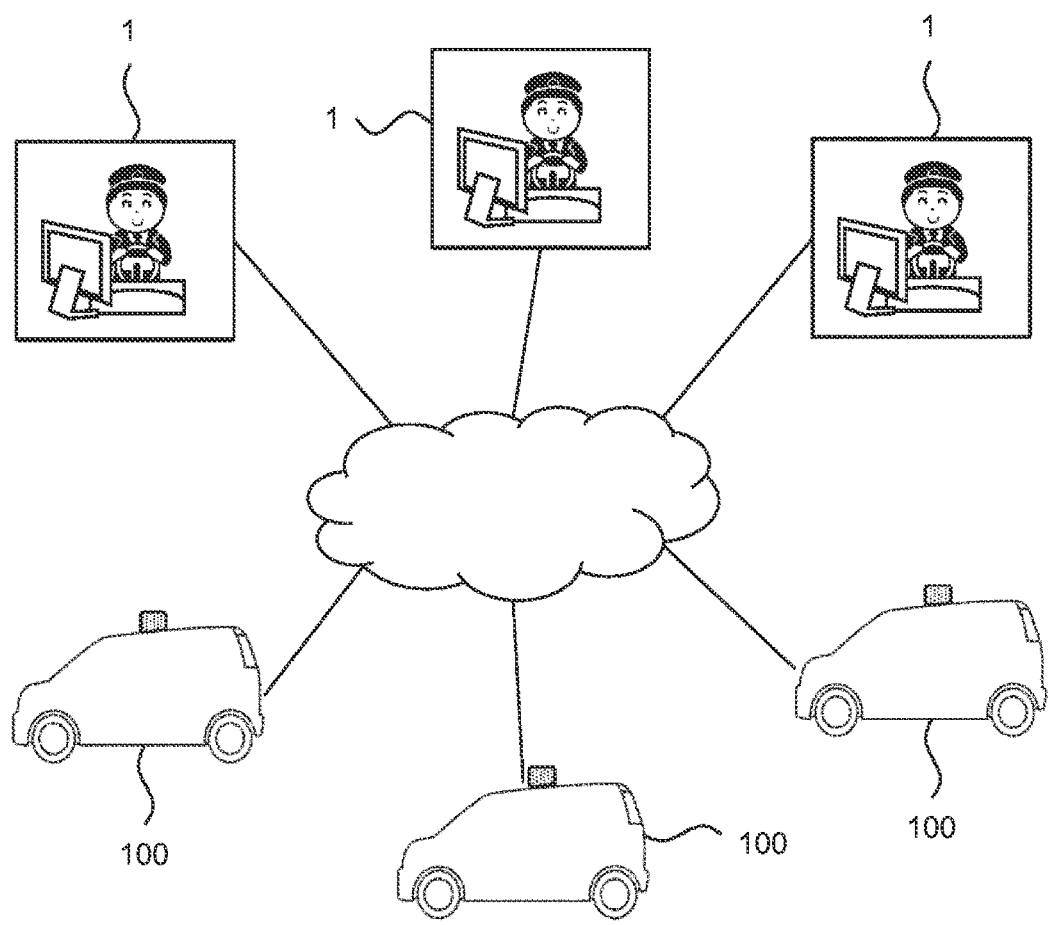
FIG. 1 is a conceptual diagram for describing an overview of a remote driving taxi service according to an embodiment of the present disclosure.

FIG. 1 is a conceptual diagram for describing an overview of a remote driving taxi service. The remote driving taxi service is a mobility service that uses remote driving taxis 100. The remote driving taxis 100 are vehicles that allow remote driving, and are remotely driven (remotely operated) by remote drivers 1. Typically, no driver is in the remote driving taxi 100. The remote driver 1 is flexibly assigned to the remote driving taxi 100, and drives the assigned remote driving taxi 100. A user in the remote driving taxi service can move to a destination by using the remote driving taxi 100 that is driven by the remote driver 1.

A characteristic of the remote driving taxi service is that the remote driver 1 is not bound by either vehicles or locations. For example, the remote driver 1 can work by driving a remote driving taxi 100-1 in a first region, and soon, can work by driving another remote driving taxi 100-2 in a second region. The first region and the second region may be distant from each other. For example, the first region may be Hokkaido, and the second region may be Kyushu. The remote driver 1 can work by driving an arbitrary remote driving taxi 100 in an arbitrary region.

As a comparison, an existing taxi service will be discussed. In the case of the existing taxi service, the taxi driver drives one taxi in a limited region. That is, the taxi driver is bound by the location and the vehicle. For example, a taxi driver that works in a region where the number of users is small waits for a customer with doing nothing for a long time, naturally. When the number of users in the region is small, the taxi driver cannot work even if the work motivation is high. This means a loss of work opportunity. As another example, in the case where the taxi driver carries a customer over a long distance, the taxi driver needs to return to a home place from a faraway place after the customer gets off the taxi at the faraway place. When the taxi driver returns to the home place from the faraway place, the taxi driver cannot always carry a customer luckily. When the taxi driver must drive the taxi in an empty state over a long distance, the operational efficiency decreases.

On the other hand, in the case of the remote driving taxi service, the remote driver 1 is not bound by either the vehicle or the location, and therefore the problem in the case of the existing taxi service does not occur. For example, the remote driver 1 does not need to continue to wait for a customer in a region where the number of users is small, and can work one after another in response to requests from users in various regions. In the region where the number of users is small, by disposing only the remote driving taxi 100, it is possible to provide the remote driving taxi service, even if there is actually no driver. As another example, even in the case where the remote driver 1 carries a passenger to a destination that is distant from a departure place, the remote driver 1 does not need to return to the departure place while driving the used remote driving taxi 100. If the remote driver 1 wants to continuously work in another region, the remote driver 1 only needs to park the previously used remote driving taxi 100 at a taxi parking area near the previous destination. The remote driving taxi 100 can be used by another remote driver 1.

In this way, the remote driving taxi service makes remarkable effects such as increase in work opportunity and enhancement in operational efficiency. A remote driving taxi system for realizing the remote driving taxi service will be described below.

2. Overview of Remote Driving Taxi System

Figure 2:
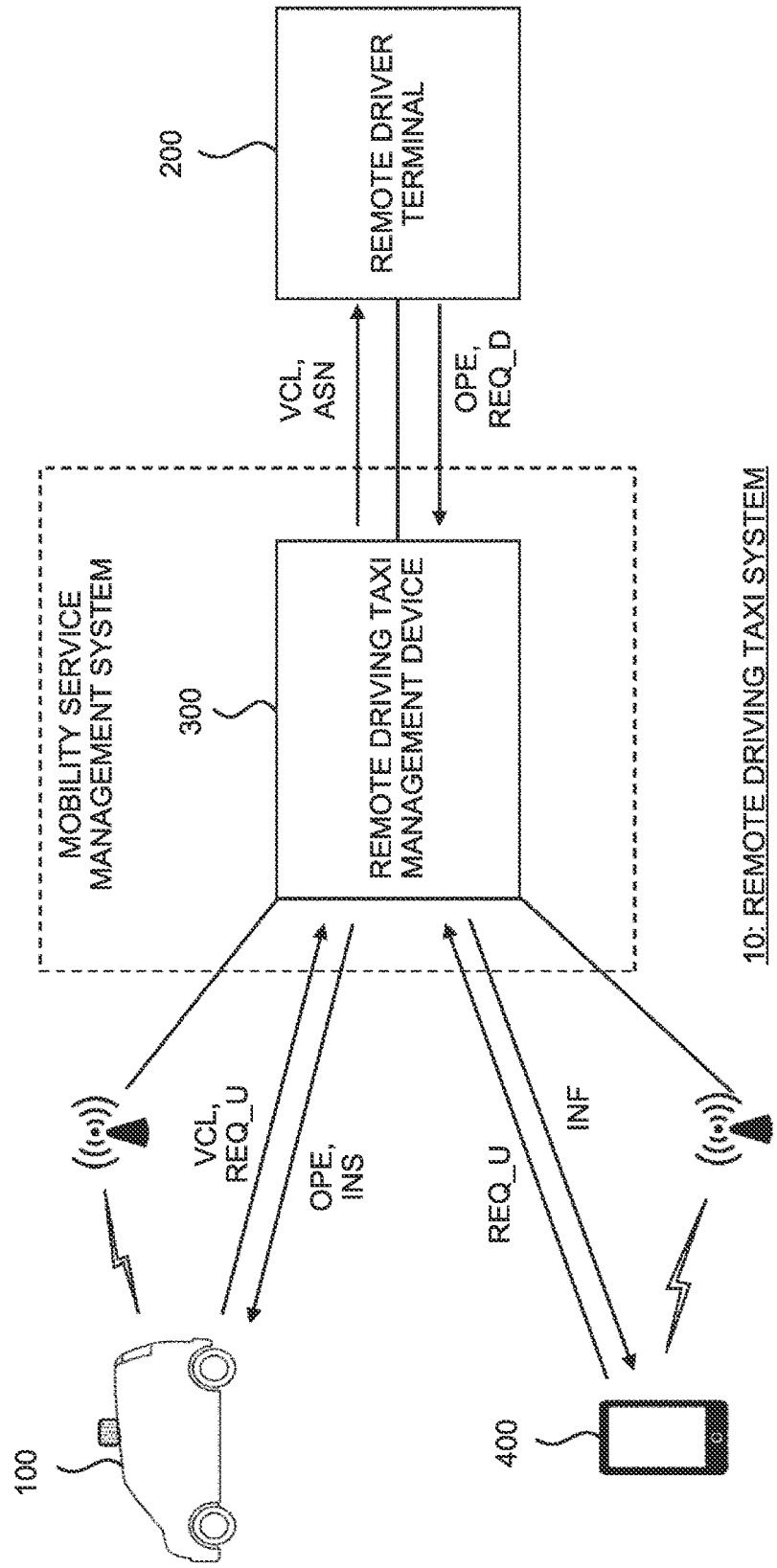
FIG. 2 is a conceptual diagram showing an exemplary configuration of the remote driving taxi system according to the embodiment of the present disclosure.

FIG. 2 is a conceptual diagram showing an exemplary configuration of the remote driving taxi system 10 according to the embodiment. The remote driving taxi system 10 provides the remote driving taxi service. The remote driving taxi system 10 includes one or more remote driving taxis 100, one or more remote driver terminals 200, and a remote driving taxi management device 300.

The remote driving taxi 100 is a vehicle that allows remote driving. The remote driving taxi 100 is equipped with various sensors, and can acquire information such as a current position, a vehicle state, and a peripheral situation. Further, the remote driving taxi 100 can wirelessly communicate with the remote driving taxi management device 300.

The remote driver terminal 200 is a device that is used by the remote driver 1 for remotely driving (remotely operating) the remote driving taxi 100. The remote driver terminal 200 includes a display device. Further, the remote driver terminal 200 includes a remote operation member that is operated when the remote driver 1 remotely drives the remote driving taxi 100. Further, the remote driver terminal 200 can communicate with the remote driving taxi management device 300.

The remote driving taxi management device 300 manages the remote driving taxi service. For example, the remote driving taxi management device 300 manages the remote driver 1 and the remote driving taxi 100. Further, the remote driving taxi management device 300 can communicate with each remote driving taxi 100 and each remote driver terminal 200. The remote driving taxi management device 300 may be included in a mobility service management system that manages the whole of the mobility service. Typically, the remote driving taxi management device 300 is a management server on the cloud. The management server may be constituted by a plurality of servers that performs distributed processing.

The remote driving taxi system 10 may further include a user terminal 400. Examples of the user terminal 400 include a smartphone and a PC. The user terminal 400 executes an application for using the remote driving taxi service. Further, the user terminal 400 can communicate with the remote driving taxi management device 300.

A basic flow of the remote driving taxi service is shown as follows.

First, the remote driving taxi management device 300 executes an "assignment process" of assigning the remote driver 1 to the remote driving taxi 100. Details of the assignment process will be described later.

The remote driver 1 remotely drives the assigned remote driving taxi 100. Specifically, the remote driving taxi 100 acquires the information such as the current position, the vehicle state, and the peripheral situation, using various sensors, and sends vehicle information VCL including the acquired information, to the remote driving taxi management device 300. The remote driving taxi management device 300 transfers the received vehicle information VCL to the remote driver terminal 200 that is used by the remote driver 1. The remote driver terminal 200 displays the received vehicle information VCL and map information on the display device. The remote driver 1 operates the remote operation member of the remote driver terminal 200, while referring to the map information and vehicle information VCL displayed on the display device. The remote driver terminal 200 sends operation information OPE indicating an operation amount of the remote operation member, to the remote driving taxi management device 300. The remote driving taxi management device 300 transfers the received operation information OPE to the remote driving taxi 100. The remote driving taxi 100 performs a vehicle traveling control in accordance with the received operation information OPE.

The remote driver 1 drives the assigned remote driving taxi 100, and picks up the user. Then, the remote driver 1 drives the remote driving taxi 100 to a destination designated by the user. When the remote driver 1 arrives at the destination, the remote driver 1 drops off the user.

3. Assignment Process

Figure 3:
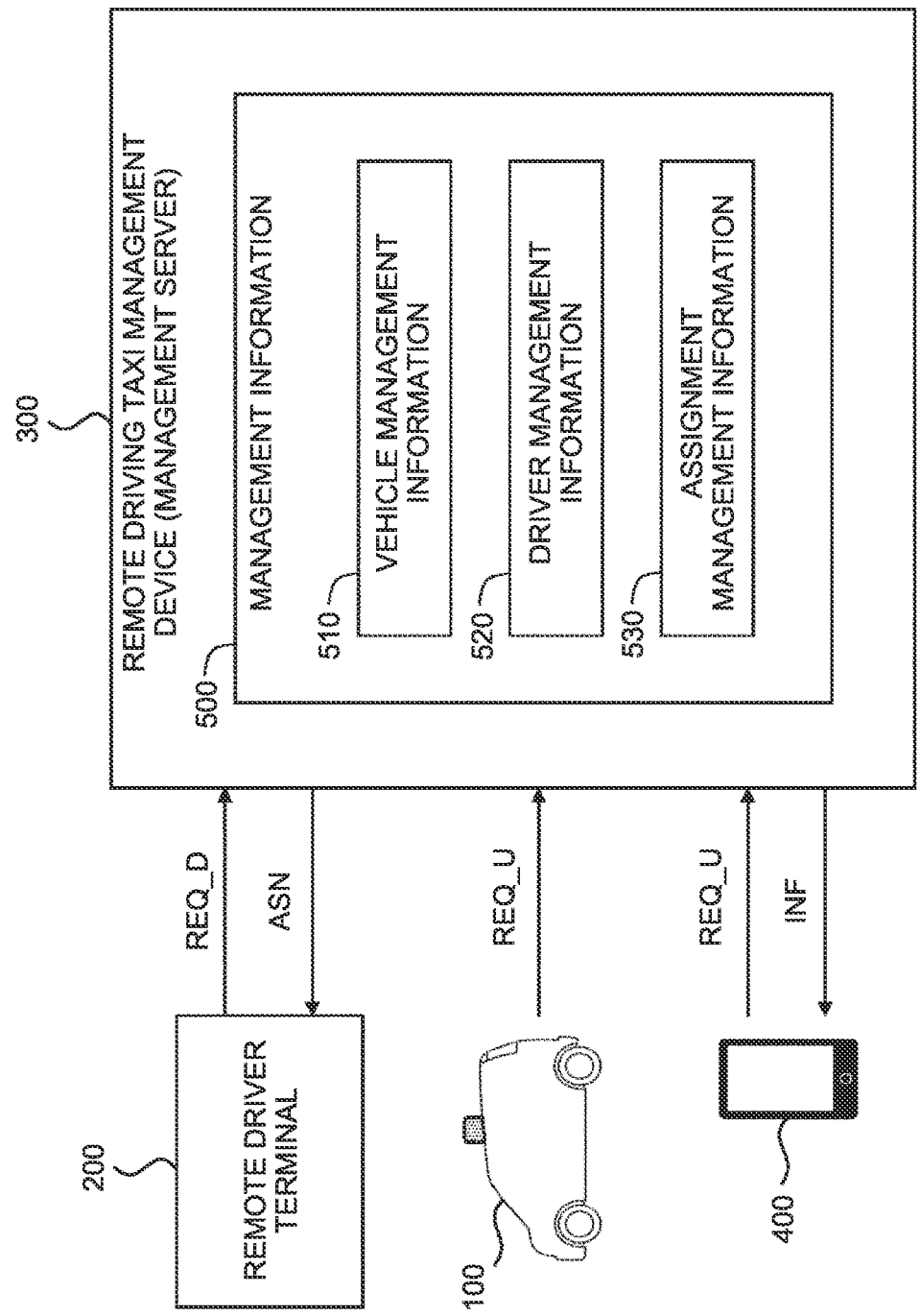
FIG. 3 is a block diagram for describing an assignment process according to the embodiment of the present disclosure.

FIG. 3 is a block diagram for describing the assignment process by the remote driving taxi management device 300 according to the embodiment. In the assignment process, the remote driving taxi management device 300 flexibly assigns the remote driver 1 to the remote driving taxi 100.

3-1. Management Information

The remote driving taxi management device 300 holds management information 500, and executes the assignment process based on the management information 500. The management information 500 includes vehicle management information 510, driver management information 520, and assignment management information 530.

3-1-1. Vehicle Management Information

FIG. 4 is a conceptual diagram for describing an example of the vehicle management information 510. The vehicle management information 510 is information for managing the remote driving taxi 100, and includes an entry for each remote driving taxi 100. For example, each entry includes a vehicle ID, a vehicle type, a use state, a driver in charge, a current position, a destination, a traveling state, and the like.

The vehicle ID is identification information about the remote driving taxi 100. The vehicle ID may include number plate information (vehicle registration number) about the remote driving taxi 100.

The vehicle type is the type of the remote driving taxi 100. Examples of the vehicle type include a large size, a middle size, and a small size. The vehicle type may include a manufacturer and a vehicle name.

The use state is the current use state of the remote driving taxi 100. Examples of the use state include an in-service state (in practice), a picking-up state, and an empty state (available). Further, the use state indicates also whether one of the remote drivers 1 has been assigned to the remote driving taxi 100.

The driver in charge indicates a driver ID of the remote driver 1 that has been assigned to the remote driving taxi 100.

The current position is the current position of the remote driving taxi 100. The current position is included in the vehicle information VCL that is sent from the remote driving taxi 100.

The destination is the destination of the remote driving taxi 100. For example, the destination is included in a service request REQ_U (described later) from the user. As other examples, the destination may be designated by the user that has got in the remote driving taxi 100, or may be sent from the remote driving taxi 100.

The traveling state is the traveling state of the remote driving taxi 100. The traveling state is included in the vehicle information VCL that is sent from the remote driving taxi 100.

3-1-2. Driver Management Information

Figure 5:
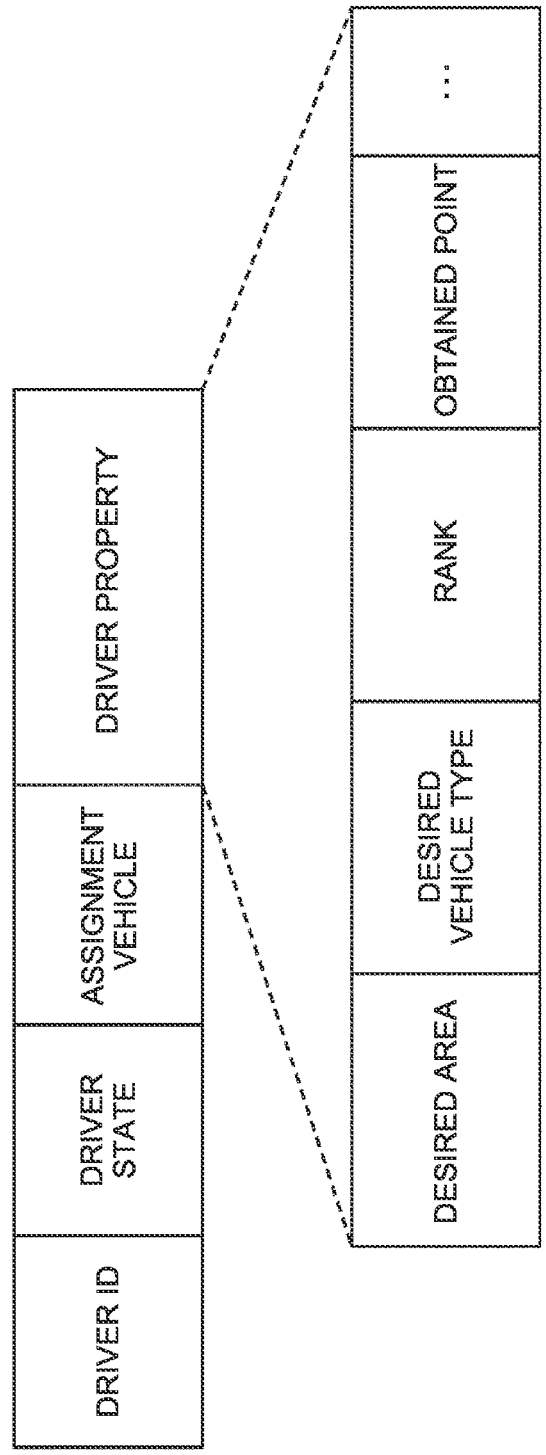
FIG. 5 is a conceptual diagram for describing an example of driver management information according to the embodiment of the present disclosure.

FIG. 5 is a conceptual diagram for describing an example of the driver management information 520. The driver management information 520 is information for managing the remote driver 1, and includes an entry for each remote driver 1. For example, each entry includes a driver ID, a driver state, an assignment vehicle, a driver property, and the like.

The driver ID is identification information about the remote driver 1. The driver ID may include the name of the remote driver 1.

The driver state is the current state of the remote driver 1. Examples of the driver state include an in-service state (passenger transporting state), a picking-up state, an open state (available). Further, the driver state indicates also whether the remote driver 1 has been assigned to one of the remote driving taxis 100.

The assignment vehicle indicates the vehicle ID of the remote driving taxi 100 to which the remote driver 1 is assigned.

The driver property indicates a taste and characteristic of the remote driver 1. For example, the driver property includes a desired area, a desired vehicle type, a rank, an obtained point, and the like.

The desired area is a region that is desired by the remote driver 1. The desired area is previously designated by the remote driver 1. For example, the remote driver 1 designates an area where the remote driver 1 is familiar with roads, as the desired area.

The desired vehicle type is the vehicle type of the remote driving taxi 100 that is desired by the remote driver 1. The desired vehicle type is previously designated by the remote driver 1.

The rank is the current rank of the remote driver 1. For example, the remote driver 1 is classified as one of ranks of five-star to no-star. As another example, the remote driver 1 may be classified as one of ranks of "excellent (SS)", "good (S)", "general (A)" and "beginner (B)". The rank of the remote driver 1 may reflect the evaluation (rating) by the user. The rank may be reflected by taxi usage fee. The rank may be reflected by the pay to the remote driver 1.

The obtained point is the number of points that the remote driver 1 has obtained until the current time. For example, the point increases depending on the number of times of the carrying of the passenger. As another example, the point increases depending on a traveling distance by which the remote driver 1 has traveled while carrying the passenger. The increase in the point may raise the rank.

The rank and the point are expected to cause the enhancement in service quality and the increase in work motivation. Further, the rank and the point generate a game element in the remote driving taxi service. As a result, the remote driver 1 can enjoy working. This also contributes to the increase in work motivation and the enhancement in service quality.

3-1-3. Assignment Management Information

FIG. 6 is a conceptual diagram for describing an example of the assignment management information 530. The assignment management information 530 is information for managing the assignment state between the remote driver 1 and the remote driving taxi 100. For example, the assignment management information 530 includes an assignment relation information 531, an unassigned taxi list 532, and an unassigned driver list 533.

The assignment relation information 531 indicates a correspondence relation between the remote driving taxi 100 and the remote driver 1 that are assigned. For example, the assignment relation information 531 indicates a correspondence relation between the vehicle ID of the remote driving taxi 100 and the driver ID of the remote driver 1 assigned to the remote driving taxi 100. In the case where a target user to which the remote driver 1 (the remote driving taxi 100) provides the service has already been decided, the assignment relation information 531 indicates also a correspondence relation with the target user.

Hereinafter, a remote driving taxi 100 to which the remote driver 1 has not yet been assigned is referred to as an "unassigned taxi 100N". The unassigned taxi list 532 is a list of unassigned taxis 100N, and indicates the vehicle IDs of the unassigned taxis 100N. The unassigned taxi list 532 may include a waiting list having a cue format. The waiting list indicates a priority order of the unassigned taxis 100N relevant to the assignment process.

Hereinafter, a remote driver 1 that has not yet been assigned to the remote driving taxi 100 is referred to as an "unassigned driver 1N". The unassigned driver list 533 is a list of unassigned drivers 1N, and indicates the driver IDs of the unassigned drivers 1N. The unassigned driver list 533 may include a waiting list having a cue format. The waiting list indicates a priority order of the unassigned drivers 1N relevant to the assignment process.

3-2. Assignment Process Responding to Request from Driver

Figure 7:
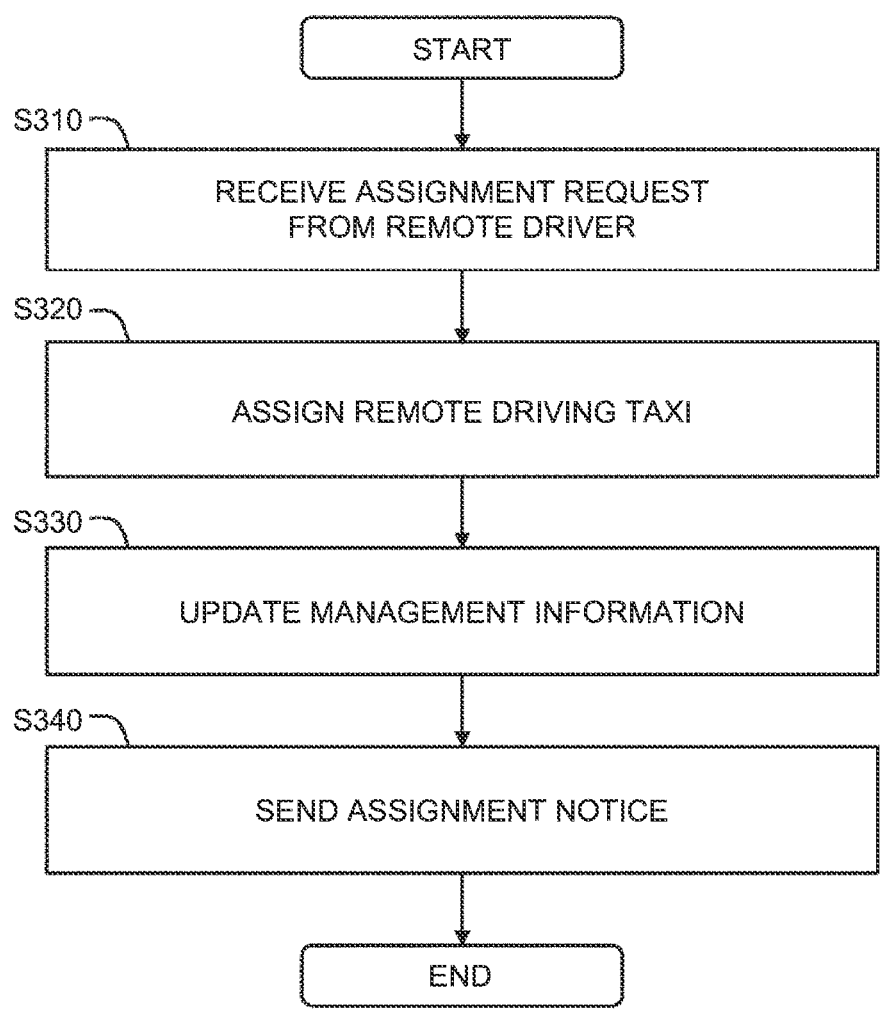
FIG. 7 is a flowchart showing an example of the assignment process according to the embodiment of the present disclosure.

FIG. 7 is a flowchart showing an example of the assignment process by the remote driving taxi management device 300 according to the embodiment. In the example, it is assumed that the remote driver 1 waits for a customer in front of a station or looks for a customer in a city.

In step S310, the unassigned driver 1N operates the remote driver terminal 200, to send an assignment request REQ_D to the remote driving taxi management device 300. For convenience, the unassigned driver 1N that sends the assignment request REQ_D is referred to as a "request driver 1R". The remote driving taxi management device 300 receives the assignment request REQ_D from the remote driver terminal 200.

In step S320, the remote driving taxi management device 300 executes the assignment process in response to the assignment request REQ_D. Specifically, the remote driving taxi management device 300 selects one of unassigned taxis 100N based on the management information 500. The unassigned taxis 100N are obtained from the unassigned taxi list 532. For convenience, the selected unassigned taxi 100N is referred to as a "first remote driving taxi 100S". The remote driving taxi management device 300 assigns the request driver 1R to the first remote driving taxi 100S.

In the case where the unassigned taxi list 532 includes the waiting list, the remote driving taxi management device 300 may select the first remote driving taxi 100S in accordance with the priority order indicated in the waiting list.

The remote driving taxi management device 300 may select the first remote driving taxi 100S based on the driver property information included in the driver management information 520. The driver property information includes the desired area and desired vehicle type for the request driver 1R. For example, the remote driving taxi management device 300 may select the unassigned taxi 100N that exists in the desired area for the request driver 1R, as the first remote driving taxi 100S. As another example, the remote driving taxi management device 300 may select the unassigned taxi 100N that meets the desired vehicle type for the request driver 1R, as the first remote driving taxi 100S. The current position and vehicle type of the unassigned taxi 100N are obtained from the vehicle management information 510.

In step S330, the remote driving taxi management device 300 updates the management information 500 based on a result of the assignment process. Particularly, the remote driving taxi management device 300 updates the management information 500 related to the request driver 1R and the first remote driving taxi 100S.

In step S340, the remote driving taxi management device 300 sends an assignment notice ASN to the remote driver terminal 200. The assignment notice ASN indicates the completion of the assignment process, the assigned first remote driving taxi 100S, and the like. The remote driver terminal 200 presents the assignment notice ASN to the request driver 1R.

In the case where there is no unassigned taxi 100N that can be assigned, the remote driving taxi management device 300 may register the request driver 1R in the unassigned driver list 533 (waiting list) as "assignment waiting".

After the completion of the assignment process, the remote driver 1 can drive the assigned remote driving taxi 100. For example, the remote driver 1 can wait for a customer in front of a station. As another example, the remote driver 1 can look for a customer in a city.

3-3. Assignment Process Responding to Request from User

Figure 8:
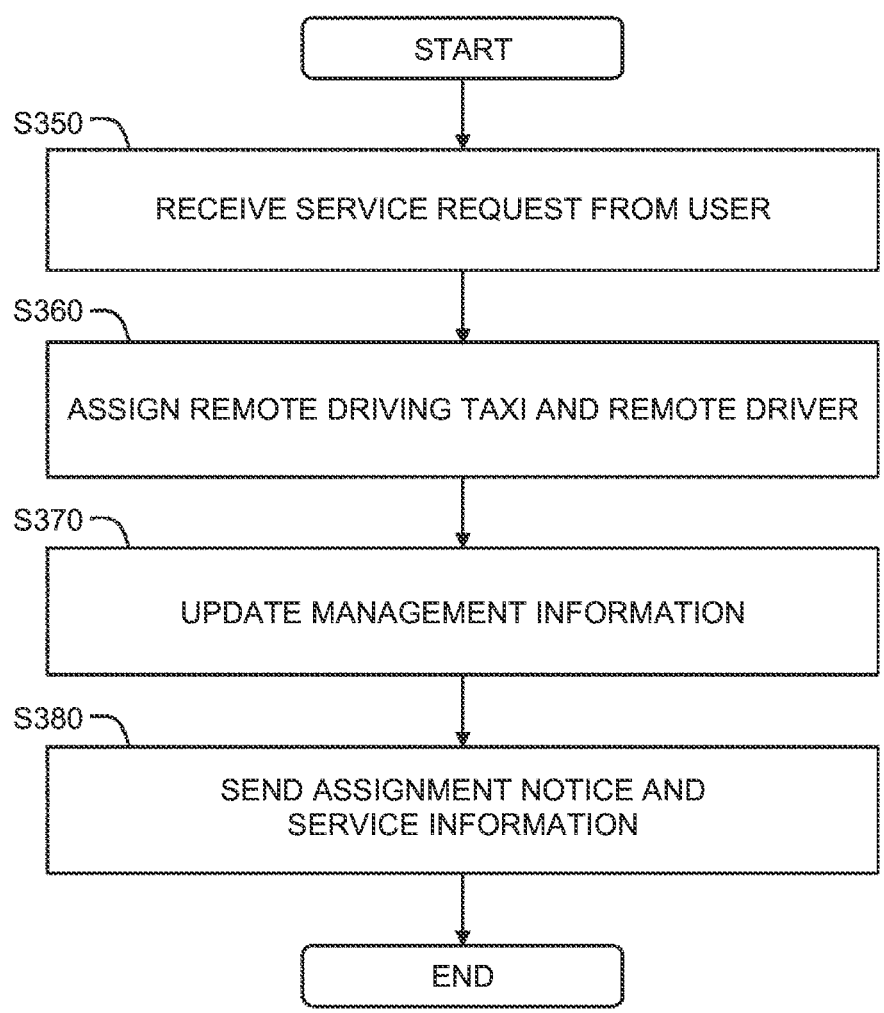
FIG. 8 is a flowchart showing another example of the assignment process according to the embodiment of the present disclosure.

FIG. 8 is a flowchart showing another example of the assignment process by the remote driving taxi management device 300 according to the embodiment.

In step S350, the remote driving taxi management device 300 receives a service request REQ_U from the user.

For example, the user executes an application on the user terminal 400, and inputs the service request REQ_U. The service request REQ_U includes a desired getting-in position that is designated by the user. Alternatively, the current position of the user terminal 400 may be regarded as the desired getting-in position. The service request REQ_U may include a desired getting-in time that is designated by the user. The service request REQ_U may include a destination that is designated by the user. The service request REQ_U may include a vehicle type of the remote driving taxi 100 that is desired by the user. The service request REQ_U may include a rank of the remote driver 1 that is desired by the user. The service request REQ_U may include the driver ID of the remote driver 1 that is designated by the user. The application on the user terminal 400 sends the service request REQ_U to the remote driving taxi management device 300.

As another example, an outside-vehicle human machine interface (HMI) may be attached to a side surface of the remote driving taxi 100. In this case, the user can convey an intention to use the remote driving taxi 100, by operating the outside-vehicle HMI. For example, the user presses a "use start button" that is displayed on the outside-vehicle HMI. Further, the user may designate a desired rank of the remote driver 1, by operating the outside-vehicle HMI. The remote driving taxi 100 sends the service request REQ_U to the remote driving taxi management device 300, in response to the operation of the outside-vehicle HMI by the user. The service request REQ_U includes the vehicle ID of the remote driving taxi 100 and the current position. The current position of the remote driving taxi 100 corresponds to the desired getting-in position.

In step S360, the remote driving taxi management device 300 executes the assignment process in response to the service request REQ_U. Specifically, the remote driving taxi management device 300 selects the unassigned taxi 100N and unassigned driver 1N that provide the service to the user, based on the management information 500. That is, the remote driving taxi management device 300 selects one unassigned taxi 100N and one unassigned driver 1N, and assigns the unassigned taxi 100N and the unassigned driver 1N to the user. For convenience, the selected unassigned taxi 100N is referred to as a "first remote driving taxi 100S". Further, for convenience, the selected unassigned driver 1N is referred to a "first remote driver 1S". The remote driving taxi management device 300 assigns the first remote driver 1S to the first remote driving taxi 100S.

For example, in the case where the user desires to use a certain remote driving taxi 100 and operates the outside-vehicle HMI of the certain remote driving taxi 100, the remote driving taxi management device 300 selects the certain remote driving taxi 100 as the first remote driving taxi 100S.

The case where the service request REQ_U is sent from the user terminal 400 is shown as follows. The service request REQ_U includes the desired getting-in position. The vehicle management information 510 includes the current position of each remote driving taxi 100. The unassigned taxi 100N is obtained from the unassigned taxi list 532. The remote driving taxi management device 300 selects the unassigned taxi 100N near the desired getting-in position, as the first remote driving taxi 100S, based on the management information 500. More specifically, the remote driving taxi management device 300 selects the first remote driving taxi 100S from unassigned taxis 100N that exist within a predetermined range from the desired getting-in position.

In the case where the unassigned taxi list 532 includes the waiting list, the remote driving taxi management device 300 may select the first remote driving taxi 100S in accordance with the priority order indicated in the waiting list.

In the case where the service request REQ_U includes the desired vehicle type for the user, the remote driving taxi management device 300 may select the unassigned taxi 100N that meets the desired vehicle type for the user, as the first remote driving taxi 100S.

The first remote driver 1S will be described below. The remote driving taxi management device 300 selects the first remote driver 1S from the unassigned drivers 1N. The unassigned drivers 1N are obtained from the unassigned driver list 533. In the case where the unassigned driver list 533 includes the waiting list, the remote driving taxi management device 300 may select the first remote driver 1S in accordance with the priority order indicated in the waiting list.

The remote driving taxi management device 300 may select the first remote driver 1S based on the driver property information included in the driver management information 520.

For example, the driver property information includes the desired area for each remote driver 1. The current position of the first remote driving taxi 100S is obtained from the vehicle management information 510. The remote driving taxi management device 300 may select the unassigned driver 1N for which the desired area contains the current position of the first remote driving taxi 100S, as the first remote driver 1S.

As another example, the driver property information includes the desired vehicle type for each remote driver 1. The vehicle type of the first remote driving taxi 100S is obtained from the vehicle management information 510. The remote driving taxi management device 300 may select the unassigned driver 1N for which the desired vehicle type coincides with the vehicle type of the first remote driving taxi 100S, as the first remote driver 1S.

Furthermore, as another example, the driver property information includes the rank of each remote driver 1. The service request REQ_U from the user may include a rank of the remote driver 1 that is desired by the user. The remote driving taxi management device 300 may select the unassigned driver 1N for which the rank is equal to or higher than the rank that is desired by the user, as the first remote driver 1S.

Furthermore, as another example, the user may designate a desired remote driver 1. In that case, the service request REQ_U includes the driver ID of the remote driver 1 designated by the user. The remote driving taxi management device 300 selects the remote driver 1 designated by the user, as the first remote driver 1S.

The remote driving taxi management device 300 may deliver the service request REQ_U to the remote driver terminals 200 of all unassigned drivers 1N that meet the condition. In the case where the unassigned driver 1N hopes to provide the service to the user, the unassigned driver 1N returns an acceptance intention to the remote driving taxi management device 300. The remote driving taxi management device 300 may select the unassigned driver 1N that returned the acceptance intention earliest, as the first remote driver 1S.

The remote driving taxi management device 300 assigns the selected first remote driver 1S to the selected first remote driving taxi 100S.

In step S370, the remote driving taxi management device 300 updates the management information 500 based on a result of assignment process. Particularly, the remote driving taxi management device 300 updates the management information 500 related to the first remote driver 1S and the first remote driving taxi 100S.

In step S380, the remote driving taxi management device 300 sends the assignment notice ASN to the remote driver terminal 200 of the first remote driver 1S. The assignment notice ASN indicates the completion of the assignment process, the assigned first remote driving taxi 100S, the desired getting-in position, the desired getting-in time, the destination, and the like. The remote driver terminal 200 presents the assignment notice ASN to the request driver 1R.

Further, the remote driving taxi management device 300 sends service information INF to the user terminal 400. The service information INF includes information relevant to the first remote driver 1S and first remote driving taxi 100S that provide the service to the user. For example, the service information INF may include the vehicle type and number plate information about the first remote driving taxi 100S. The service information INF may include the name and rank of the first remote driver 1s.

After the completion of the assignment process, the first remote driver 1S can drive the assigned first remote driving taxi 100S. The first remote driver 1S moves the first remote driving taxi 100S to the desired getting-in position, and picks up the user.

4. Display Lamp Control

Whether the remote driving taxi 100 is currently available is decided depending on the current use state of the remote driving taxi 100. For example, in the case where the use state is the "in-service state" or the "picking-up state", the remote driving taxi 100 is unavailable. On the other hand, in the case where the use state is the "empty state", the remote driving taxi 100 is available.

Since no driver is in the remote driving taxi 100, it can be difficult for the user to determine whether the remote driving taxi 100 is available. Hence, the remote driving taxi system 10 according to the embodiment executes a "display lamp control" for appropriately giving notice of whether the remote driving taxi 100 is available.

Figure 9:
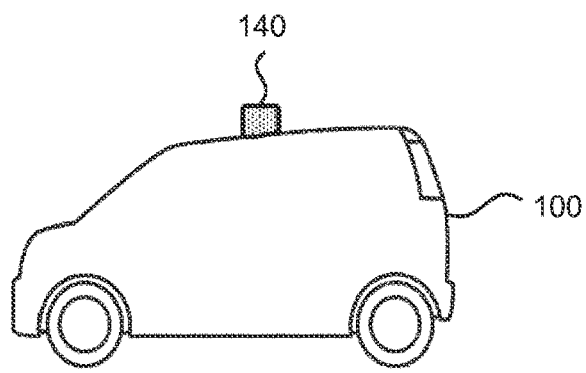
FIG. 9 is a conceptual diagram for describing an example of a display lamp control according to the embodiment of the present disclosure.

FIG. 9 is a conceptual diagram for describing an example of the display lamp control according to the embodiment. The remote driving taxi 100 includes a display lamp 140 that indicates whether the remote driving taxi 100 is currently available. Typically, the display lamp 140 is attached to a roof of the remote driving taxi 100. In the case where the display lamp 140 is in an on-state, the display lamp 140 means that the remote driving taxi 100 is currently available. On the other hand, in the case where the display lamp 140 is an off-state, the display lamp 140 means that the remote driving taxi 100 is currently unavailable.

As described above, the vehicle management information 510 indicates the use state of each remote driving taxi 100. Further, the assignment management information 530 indicates the assignment state between the remote driver 1 and the remote driving taxi 100. The remote driving taxi system 10 according to the embodiment executes the display lamp control based on the management information 500.

First, the remote driving taxi 100 to which the remote driver 1 has already been assigned will be discussed. The remote driving taxi system 10 automatically puts on the display lamp 140 of the remote driving taxi 100 that is currently available, and automatically puts off the display lamp 140 of the remote driving taxi 100 that is currently unavailable. More specifically, the remote driving taxi management device 300 recognizes the use state of the remote driving taxi 100 to which the remote driver 1 has already assigned, based on the management information 500. Then, the remote driving taxi management device 300 sends instruction information INS for giving an instruction to put on or put off the display lamp 140, to the remote driving taxi 100, depending on the use state. The remote driving taxi 100 automatically puts on or puts off its own display lamp 140, in accordance with the received instruction information INS. In this way, the remote driving taxi system 10 (the remote driving taxi management device 300) automatically controls the lighting state of the display lamp 140 of the remote driving taxi 100.

Next, the unassigned taxi 100N to which the remote driver 1 has not yet assigned will be discussed. The unassigned taxi 100N can be recognized based on the unassigned taxi list 532.

In a first example, the remote driving taxi system 10 automatically puts off the display lamp 140 of the unassigned taxi 100N.

In a second example, "the number of unassigned drivers 1N" is considered. The unassigned driver 1N can be recognized based on the unassigned driver list 533. When there is an unassigned driver 1N, it is possible to immediately assign the unassigned driver 1N to the unassigned taxi 100N, in response to the service request REQ_U from the user. That is, when there is an unassigned driver 1N, it is possible to immediately put the unassigned taxi 100N into an available state, without keeping the user waiting. From the above standpoint, the remote driving taxi system 10 selects the unassigned taxi 100N that puts on the display lamp 140, depending on the number of unassigned drivers 1N. For example, the remote driving taxi system 10 selects unassigned taxis 100N to a number equal to or smaller than the number of unassigned drivers 1N. The remote driving taxi system 10 may select unassigned taxis 100N to the same number as the number of unassigned drivers 1N. Then, the remote driving taxi system 10 automatically puts on the display lamps 140 of the selected unassigned taxis 100N, and automatically puts off the display lamps 140 of the other unassigned taxis 100N. By appropriately putting on the display lamp 140 of the unassigned taxi 100N, it is possible to increase options for the user.

In a third example, the unassigned taxi list 532 includes the waiting list indicating the priority order of the unassigned taxi 100N relevant to the assignment process. It is expected that the remote driver 1 can be assigned to the unassigned taxi 100N having a high order in the waiting list immediately or in a short waiting time. From the above standpoint, the remote driving taxi system 10 selects unassigned taxis 100N from the top to a predetermined order in the waiting list. Then, the remote driving taxi system 10 automatically puts on the display lamps 140 of the selected unassigned taxis 100N, and automatically puts off the display lamps 140 of the other unassigned taxis 100N. By appropriately putting on the display lamp 140 of the unassigned taxi 100N, it is possible to increase options for the user.

In each of the above first to third examples, the remote driving taxi management device 300 can decide whether to put on the display lamp 140 for each unassigned taxi 100N, based on the management information 500. Then, the remote driving taxi management device 300 sends the instruction information INS for giving the instruction to put on or put off the display lamp 140, to the unassigned taxi 100N. The unassigned taxi 100N automatically puts on or puts off its own display lamp 140, in accordance with the received instruction information INS. In this way, the remote driving taxi system 10 (the remote driving taxi management device 300) automatically controls the lighting state of the display lamp 140 of the remote driving taxi 100.

As a modification, in the case where the display lamp 140 is put on, the "showing way" may be changed depending on whether the remote driver 1 has already been assigned to the remote driving taxi 100. For example, in the case where the remote driver 1 has been assigned, the display lamp 140 may be put on more brightly than in the case where the remote driver 1 has not been assigned.

As described above, the notice of whether the remote driving taxi 100 is available is appropriately given by the putting-on/putting-off of the display lamp 140 of the remote driving taxi 100. Thereby, the user can easily recognize whether the remote driving taxi 100 is available.

5. Traveling Restriction Process

Figure 10:
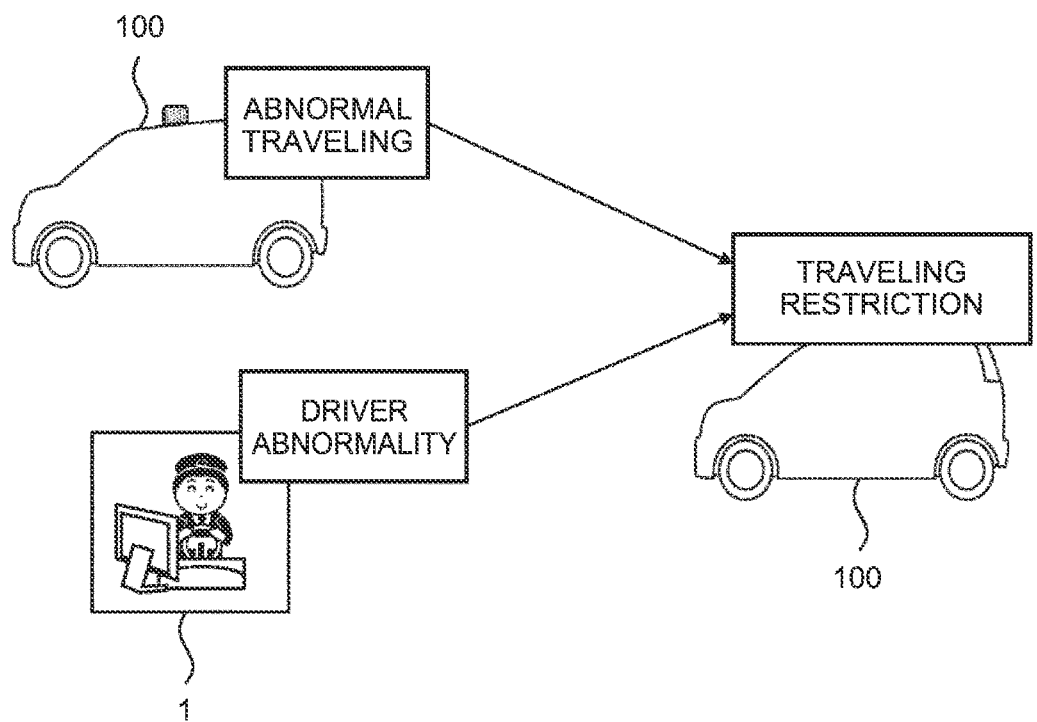
FIG. 10 is a conceptual diagram for describing a traveling restriction process according to the embodiment of the present disclosure.

FIG. 10 is a conceptual diagram for describing a "traveling restriction process" according to the embodiment. The remote driving taxi system 10 restricts the traveling of the designated remote driving taxi 100, as necessary. For example, as a traveling restriction, the vehicle speed upper limit is set to a value lower than a default value. As another example, the traveling restriction includes an emergency stop. Furthermore, as another example, the traveling restriction includes an evacuation to a safe position such as a road shoulder.

For example, from the remote driving taxi 100 that is being driven by the remote driver 1, the remote driving taxi management device 300 acquires the vehicle information VCL including the traveling state of the remote driving taxi 100. The remote driving taxi management device 300 monitors the traveling state of the remote driving taxi 100 based on the vehicle information VCL, and determines whether there is abnormal traveling. Examples of the abnormal traveling include an oversight of a traffic sign, a violation of a traffic regulation, and erratic driving. For the violation of the traffic regulation, a certain permissible range may be set because there can be an unavoidable circumstance. In the case where the abnormal traveling is detected, the remote driving taxi management device 300 sends the instruction information INS for giving an instruction of the traveling restriction, to the remote driving taxi 100 that is performing the abnormal traveling. The remote driving taxi 100 receives the instruction information INS, and performs the traveling restriction in accordance with the instruction information INS.

As another example, the remote driving taxi 100 that is being driven by the remote driver 1 may acquire the vehicle information VCL, and may determine whether there is the abnormal driving of the remote driving taxi 100 itself, based on the vehicle information VCL. In the case where the abnormal traveling is detected, the remote driving taxi 100 performs the traveling restriction.

Furthermore, as another example, the remote driver terminal 200 may include a driver monitor that detects biological information (heart rate, pulse, eye movement, and the like) about the remote driver 1. The remote driver terminal 200 determines whether there is an abnormality of the remote driver 1, based on a detection result by the driver monitor. Examples of the abnormality of the remote driver 1 include a catnap and a sudden illness. In the case where the abnormality of the remote driver 1 is detected, the remote driver terminal 200 gives notice of the occurrence of the driver abnormality, to the remote driving taxi management device 300. The remote driving taxi management device 300 sends the instruction information INS for giving the instruction of the traveling restriction, to the remote driving taxi 100 that is being driven by the remote driver 1 in which the abnormality has occurred. The remote driving taxi 100 receives the instruction information INS, and performs the traveling restriction in accordance with the instruction information INS.

Furthermore, as another example, the remote driving taxi management device 300 may receive the biological information detected by the driver monitor, from the remote driver terminal 200. In this case, the remote driving taxi management device 300 determines whether there is the abnormality of the remote driver 1.

In this way, the remote driving taxi system 10 (the remote driving taxi management device 300, the remote driving taxi 100) controls the remote driving taxi 100 such that the remote driving taxi 100 performs the traveling restriction, as necessary. By the traveling restriction, it is possible to restrain the occurrence of an accident.

The history of the abnormal traveling may be reflected by the evaluation and pay to the remote driver 1. Thereby, it is expected that the awareness of the remote driver 1 rises and the remote driver 1 performs the remote driving more carefully. This also contributes to the accident restraint.

6. Example of Remote Driving Taxi
6-1. Exemplary Configuration

Figure 11:
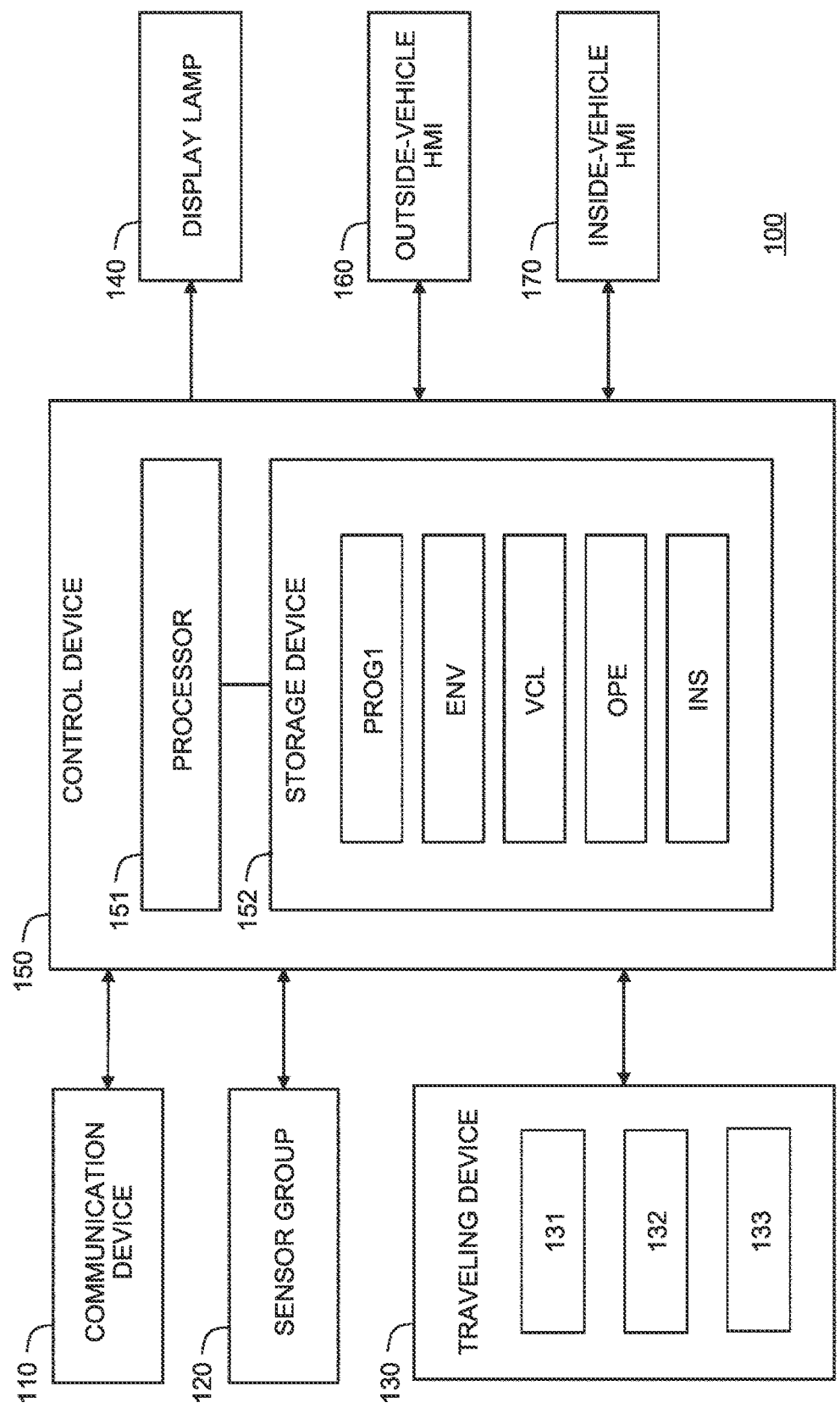
FIG. 11 is a block diagram showing an exemplary configuration of a remote driving taxi according to the embodiment of the present disclosure.

FIG. 11 is a block diagram showing an exemplary configuration of the remote driving taxi 100 according to the embodiment. The remote driving taxi 100 includes a communication device 110, a sensor group 120, a traveling device 130, the display lamp 140, a control device 150, an outside-vehicle HMI 160, and an inside-vehicle HMI 170.

The communication device 110 communicates with the remote driving taxi management device 300.

The sensor group 120 includes a vehicle state sensor that detects the state of the remote driving taxi 100. The vehicle state sensor includes a speed sensor, an acceleration sensor, a yaw rate sensor, a steering angle sensor, and the like. Furthermore, the sensor group 120 includes a position sensor that detects the position of the remote driving taxi 100. Examples of the position sensor include a global positioning system (GPS) sensor. Furthermore, the sensor group 120 includes a recognition sensor that recognizes (detects) the situation in the periphery of the remote driving taxi 100. Examples of the recognition sensor include a camera, a laser imaging detection and ranging (LIDAR), and a radar.

The traveling device 130 includes a steering device 131, a driving device 132, and a braking device 133. The steering device 131 turns wheels. For example, the steering device 131 includes a power steering (electric power steering (EPS)) device. The driving device 132 is a dynamic power source that generates driving power. Examples of the driving device 132 include an engine, an electric motor, and an in-wheel motor. The braking device 133 generates braking power.

The display lamp 140 indicates whether the remote driving taxi 100 is currently available. Typically, the display lamp 140 is attached to the roof of the remote driving taxi 100.

The control device 150 controls the remote driving taxi 100. The control device 150 includes a single or a plurality of processors 151 (referred to as merely a processor 151 hereinafter), and a single or a plurality of storage devices 152 (referred to as merely a storage device 152 hereinafter). The processor 151 executes a variety of processes. For example, the processor 151 includes a central processing unit (CPU). The storage device 152 stores a variety of information necessary for the processing by the processor 151. Examples of the storage device 152 include a volatile memory, a nonvolatile memory, a hard disk drive (HDD), and a solid state drive (SSD). The control device 150 may include a single or a plurality of electronic control units (ECUs).

A vehicle control program PROG1 is a computer program that is executed by the processor 151. The vehicle control program PROG1 is stored in the storage device 152. Alternatively, the vehicle control program PROG1 may be recorded in a computer-readable recording medium. The processor 151 executes the vehicle control program PROG1, so that a function of the control device 150 is realized.

The outside-vehicle HMI 160 is attached to a side surface of the remote driving taxi 100. The user can convey an intention to use the remote driving taxi 100, by operating the outside-vehicle HMI 160. For example, the user presses a "use start button" that is displayed on the outside-vehicle HMI 160.

The inside-vehicle HMI 170 is installed in a cabin of the remote driving taxi 100. The inside-vehicle HMI 170 includes a display device, a speaker, a microphone, a touch panel, and the like. The user can convey the destination to the remote driver 1 using the inside-vehicle HMI 170. Further, the user can have a conversation with the remote driver 1 through the inside-vehicle HMI 170.

6-2. Information Acquisition Process, Communication Process

The processor 151 acquires driving environment information ENV indicating a driving environment of the remote driving taxi 100, using the sensor group 120. The driving environment information ENV is stored in the storage device 152. The driving environment information ENV includes vehicle position information, vehicle state information, and peripheral situation information. The vehicle position information indicates the position of the remote driving taxi 100 that is detected by the position sensor. The vehicle state information indicates a vehicle state that is detected by the vehicle state sensor.

The peripheral situation information indicates a recognition result by the recognition sensor. For example, the peripheral situation information includes an image that is picked up by the camera. The peripheral situation information may include physical body information relevant to a physical body in the periphery of the remote driving taxi 100. Examples of the physical body in the periphery of the remote driving taxi 100 include a pedestrian, another vehicle (a preceding vehicle, a parked vehicle, or the like), a sign, a white line, and a roadside structure. The physical body information indicates a relative position and relative speed of the physical body with respect to the remote driving taxi 100.

The vehicle information VCL is used in the remote driving of the remote driving taxi 100 by the remote driver 1. The vehicle information VCL includes at least some pieces of the above-described driving environment information ENV. For example, the vehicle information VCL includes the vehicle position information, the vehicle state information, and the peripheral situation information. Furthermore, the vehicle information VCL may include the current use state of the remote driving taxi 100. The vehicle management information 510 is updated based on the use state. Furthermore, the vehicle information VCL may include information that is input from the user through the outside-vehicle HMI 160 or the inside-vehicle HMI 170.

The processor 151 communicates with the remote driving taxi management device 300 through the communication device 110. For example, the processor 151 sends the vehicle information VCL to the remote driving taxi management device 300. As another example, the processor 151 sends the service request REQ_U to the remote driving taxi management device 300. Furthermore, as another example, the processor 151 receives the operation information OPE from the remote driving taxi management device 300. Furthermore, as another example, the processor 151 receives the instruction information INS from the remote driving taxi management device 300.

6-3. Vehicle Traveling Control

The processor 151 executes a vehicle traveling control for controlling the traveling of the remote driving taxi 100. The vehicle traveling control includes a steering control, a driving control, and a braking control. The processor 151 executes the vehicle traveling control by controlling the traveling device 130. More specifically, the processor 151 performs the steering control by controlling the steering device 131. The processor 151 performs the driving control by controlling the driving device 132. The processor 151 performs the braking control by controlling the braking device 133.

During the remote driving, the processor 151 performs the vehicle traveling control in accordance with the operation information OPE that is received from the remote driving taxi management device 300.

6-4. Display Lamp Control

In association with the display lamp control (see the above-described section 4), the processor 151 receives the instruction information INS for giving the instruction to put on or put off the display lamp 140, from the remote driving taxi management device 300. The processor 151 automatically puts on or puts off the display lamp 140 in accordance with the received instruction information INS.

6-5. Traveling Restriction Process

In association with the traveling restriction process (see the above-described section 5), the processor 151 receives the instruction information INS for giving the instruction of the traveling restriction, from the remote driving taxi management device 300. The processor 151 performs the traveling restriction in accordance with the received instruction information INS.

Alternatively, the processor 151 may determine whether there is the abnormal traveling of the own vehicle, based on the vehicle information VCL. In the case where the abnormal traveling is detected, the processor 151 performs the traveling restriction.

7. Example of Remote Driver Terminal 7-1. Exemplary Configuration

Figure 12:
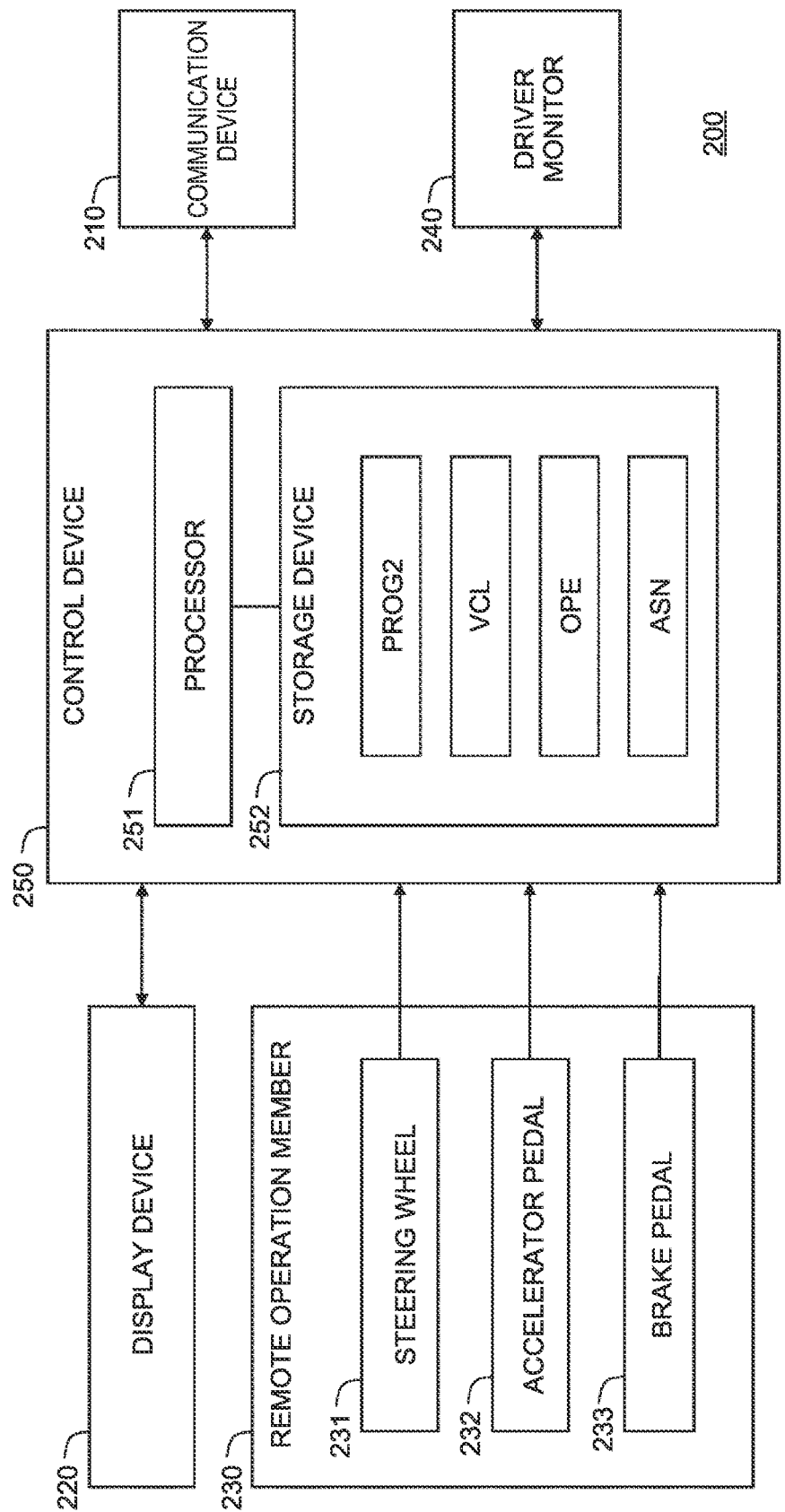
FIG. 12 is a block diagram showing an exemplary configuration of a remote driver terminal according to the embodiment of the present disclosure.

FIG. 12 is a block diagram showing an exemplary configuration of the remote driver terminal 200 according to the embodiment. The remote driver terminal 200 includes a communication device 210, a display device 220, a remote operation member 230, a driver monitor 240, and a control device 250.

The communication device 210 communicates with the remote driving taxi management device 300.

The display device 220 presents a variety of information to the remote driver 1 by displaying the variety of information.

The remote operation member 230 is a member that is operated by the remote driver 1 at the time of the remote driving (remote operation) of the remote driving taxi 100. The remote operation member 230 includes a steering wheel 231, an accelerator pedal 232, a brake pedal 233, a direction indicator, and the like.

The driver monitor 240 detects the biological information (heart rate, pulse, eye movement, and the like) about the remote driver 1.

The control device 250 controls the remote driver terminal 200. The control device 250 includes a single or a plurality of processors 251 (referred to as merely a processor 251 hereinafter), and a single or a plurality of storage devices 252 (referred to as merely a storage device 252 hereinafter). The processor 251 executes a variety of processes. For example, the processor 251 includes a CPU. The storage device 252 stores a variety of information necessary for the processing by the processor 251. Examples of the storage device 252 include a volatile memory, a nonvolatile memory, an HDD, and as SSD.

A remote driving program PROG2 is a computer program that is executed by the processor 251. The remote driving program PROG2 is stored in the storage device 252. Alternatively, the remote driving program PROG2 may be recorded in a computer-readable recording medium. The remote driving program PROG2 may be provided via a network. The processor 251 executes the remote driving program PROG2, so that a function of the control device 250 is realized.

7-2. Remote Driving Process

The processor 251 communicates with the remote driving taxi management device 300 through the communication device 210. The processor 251 receives the vehicle information VCL sent from the remote driving taxi 100 to which the remote driver 1 has been assigned. The vehicle information VCL is stored in the storage device 252. The processor 251 presents the vehicle information VCL to the remote driver 1 by displaying the vehicle information VCL on the display device 220. Further, the processor 251 displays the map information on the display device 220. The remote driver 1 can know the situation of the remote driving taxi 100, based on the map information and vehicle information VCL displayed on the display device 220.

The remote driver 1 operates the remote operation member 230. The processor 251 acquires the operation amount of the remote operation member 230 by the remote driver 1. The operation amount is detected by a sensor that is installed in the remote operation member 230. The processor 251 generates the operation information OPE that reflects the operation amount, and sends the operation information OPE to the remote driving taxi management device 300.

7-3. Assignment Process

In association with the assignment process (see the above-described section 3-2), the processor 251 sends the assignment request REQ_D input by the remote driver 1, to the remote driving taxi management device 300. Further, the processor 251 receives the assignment notice ASN from the remote driving taxi management device 300.

7-4. Information Notification Process

The processor 251 may give notice of the current driver state to the remote driving taxi management device 300 through the communication device 210. The driver management information 520 is updated based on the driver state.

7-5. Traveling Restriction Process

In association with the traveling restriction process (see the above-described section 5), the processor 251 determines whether there is the abnormality of the remote driver 1, based on the detection result by the driver monitor 240. In the case where the abnormality of the remote driver 1 is detected, the processor 251 gives notice of the occurrence of the driver abnormality to the remote driving taxi management device 300. Alternatively, the processor 251 may send the biological information detected by the driver monitor, to the remote driving taxi management device 300.

Figure 13:
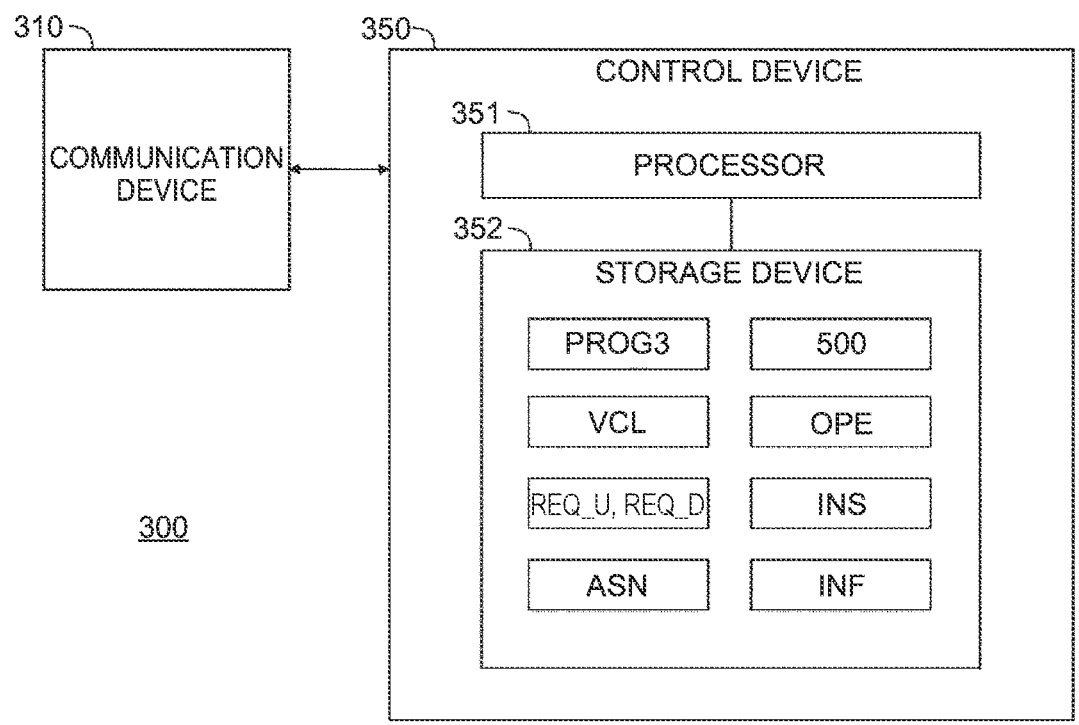
FIG. 13 is a block diagram showing an exemplary configuration of a remote driving taxi management device according to the embodiment of the present disclosure.

8. Example of Remote Driving Taxi Management Device 8-1. Exemplary Configuration FIG. 13 is a block diagram showing an exemplary configuration of the remote driving taxi management device 300 according to the embodiment. The remote driving taxi management device 300 includes a communication device 310 and a control device 350.

The communication device 310 communicates with each of the remote driving taxi 100, the remote driver terminal 200, and the user terminal 400.

The control device 350 controls the remote driving taxi management device 300. The control device 350 includes a single or a plurality of processors 351 (referred to as merely a processor 351 hereinafter), and a single or a plurality of storage devices 352 (referred to as merely a storage device 352 hereinafter). The processor 351 executes a variety of processes. For example, the processor 351 includes a CPU. The storage device 352 stores a variety of information necessary for the processing by the processor 351. For example, the management information 500 (see FIG. 3) is stored in the storage device 352. Examples of the storage device 352 include a volatile memory, a nonvolatile memory, an HDD, and an SSD.

A management program PROG3 is a computer program that is executed by the processor 351. The management program PROG3 is stored in the storage device 352. Alternatively, the management program PROG3 may be recorded in a computer-readable recording medium. The management program PROG3 may be provided via a network. The processor 351 executes the management program PROG3, so that a function of the control device 350 is realized.

8-2. Remote Driving Process

The processor 351 communicates with the remote driving taxi 100 and the remote driver terminal 200 through the communication device 310. The processor 351 receives the vehicle information VCL from the remote driving taxi 100, and transfers the vehicle information VCL to the remote driver terminal 200. Further, the processor 351 receives the operation information OPE from the remote driver terminal 200, and transfers the operation information OPE to the remote driving taxi 100.

8-3. Assignment Process

In association with the assignment process (see the above-described section 3), the processor 351 receives the assignment request REQ_D from the remote driver terminal 200. Further, the processor 351 receives the service request REQ_U from the remote driving taxi 100 or the user terminal 400. In response to the assignment request REQ_D or the service request REQ_U, the processor 351 executes the assignment process based on the management information 500 (see the above-described sections 3-2, 3-3). The processor 351 updates the management information 500 based on a result of the assignment process. Further, the processor 351 sends the assignment notice ASN to the remote driver terminal 200. Further, the processor 351 sends the service information INF to the user terminal 400.

8-4. Display Lamp Control

In association with the display lamp control (see the above-described section 4), the processor 351 recognizes the user state of each remote driving taxi 100, and the like, based on the management information 500, and determines the putting-on or putting-off of the display lamp 140. Then, the processor 351 sends the instruction information INS for giving the instruction to put on or put off the display lamp 140, to the remote driving taxi 100.

8-5. Traveling Restriction Process

In association with the traveling restriction process (see the above-described section 5), the processor 351 acquires the vehicle information VCL from the remote driving taxi 100 that is being driven by the remote driver 1. The processor 351 monitors the traveling state of the remote driving taxi 100 based on the vehicle information VCL, and determines whether there is the abnormal traveling. The processor 351 sends the instruction information INS for giving the instruction of the traveling restriction, to the remote driving taxi 100 that is performing the abnormal traveling.

Further, the processor 351 receives the notice of the occurrence of the driver abnormality, from the remote driver terminal 200. The processor 351 sends the instruction information INS for giving the instruction of the traveling restriction, to the remote driving taxi 100 that is being driven by the remote driver 1 in which the abnormality has occurred.

9. Demand Prediction

It is useful to predict the demand for the remote driving taxi service for each area. For example, based on the demand prediction, it is possible to optimize the disposition of the remote driving taxi 100 for each area. For example, it is possible to previously dispose a greater number of remote driving taxis 100 to an area where the demand is high. Thereby, the service opportunity increases, and the profit increases. Further, the waiting time of the user is shortened, and therefore the user satisfaction level is enhanced.

What is claimed is:

1. A remote driving taxi system that provides a mobility service, the mobility service using remote driving taxis that are driven by remote drivers, the remote driving taxi system comprising:

the remote driving taxis;

a server configured to wirelessly communicate with the remote driving taxis; and remote driver terminals each associated with a corresponding remote driver from among the remote drivers, wherein each of the remote driver terminals includes a remote operation member and one or more terminal processors, the remote operation member including a steering device, an accelerator pedal, and a brake pedal configured to be operated by the corresponding remote driver, and the one or more terminal processors being configured to communicate with the server, the server includes one or more first processors and one or more memories configured to store a current position of each of the remote driving taxis, a desired area designated by each of the remote drivers, and an unassigned taxi list indicating unassigned remote driving taxis corresponding to the remote driving taxis to which a remote driver from among the remote drivers is not assigned, and an unassigned driver list indicating unassigned remote drivers corresponding to the remote drivers to which a remote driving taxi from among the remote driving taxis is not assigned, the one or more first processors of the server are configured to:

receive, via wireless communication, the current position from the remote driving taxis;

receive an assignment request from a first unassigned remote driver in the unassigned driver list via the one or more terminal processors of a first remote driver terminal from among the remote driver terminals;

select from the unassigned taxi list, in response to receipt of the assignment request, a first remote driving taxi of which the current position is located in the desired area; and assign the first unassigned remote driver to the selected first remote driving taxi, the remote driving taxis each includes a display lamp and one or more second processors, the one or more second processors of the selected first remote driving taxi are configured to:

receive operation information indicating an operation amount of the remote operation member associated with the assigned first unassigned remote driver; and control steering, acceleration, and braking of the selected first remote driving taxi based on the operation information, the one or more first processors are further configured to:

select second remote driving taxis from the unassigned taxi list, a number of the second remote driving taxis being a number equal to or smaller than a number of unassigned remote drivers in the unassigned driver list; and send, to each of the selected second remote driving taxis, an instruction to turn on the display lamp, and the one or more second processors of each of the second remote driving taxis are further configured to:

receive the instruction from the one or more first processors; and automatically turn on the display lamp in response to receipt of the instruction.

\* \* \* \* \*